United States Patent
Pasatta et al.

(10) Patent No.: US 10,787,560 B2
(45) Date of Patent: Sep. 29, 2020

(54) EPOXY TERMINATED BUTADIENE AND BUTADIENE ACRYLONITRILE COPOLYMERS

(71) Applicant: EMERALD SPECIALTY POLYMERS, LLC, Akron, OH (US)

(72) Inventors: Jeremy Pasatta, Olmsted Falls, OH (US); Yu Chen, Hudson, OH (US)

(73) Assignee: Emerald Specialty Polymers, LLC, The Woodlands, TX (US)

( * ) Notice: Subject to any disclaimer, the term of this patent is extended or adjusted under 35 U.S.C. 154(b) by 171 days.

(21) Appl. No.: 15/761,866

(22) PCT Filed: Sep. 22, 2016

(86) PCT No.: PCT/US2016/053039
§ 371 (c)(1),
(2) Date: Mar. 21, 2018

(87) PCT Pub. No.: WO2017/053526
PCT Pub. Date: Mar. 30, 2017

(65) Prior Publication Data
US 2018/0258261 A1 Sep. 13, 2018

Related U.S. Application Data

(60) Provisional application No. 62/221,914, filed on Sep. 22, 2015.

(51) Int. Cl.
| | |
|---|---|
| *C09J 163/08* | (2006.01) |
| *C09J 163/00* | (2006.01) |
| *C09J 109/02* | (2006.01) |
| *C09J 109/00* | (2006.01) |
| *C08C 19/06* | (2006.01) |
| *C08G 59/22* | (2006.01) |
| *C08L 9/02* | (2006.01) |
| *C08G 59/06* | (2006.01) |
| *C08L 15/00* | (2006.01) |
| *C08C 19/38* | (2006.01) |
| *C08F 136/06* | (2006.01) |
| *C08G 59/40* | (2006.01) |
| *C09J 11/08* | (2006.01) |
| *C08G 59/44* | (2006.01) |

(52) U.S. Cl.
CPC ............... *C08L 9/02* (2013.01); *C08C 19/06* (2013.01); *C08C 19/38* (2013.01); *C08F 136/06* (2013.01); *C08G 59/063* (2013.01); *C08G 59/22* (2013.01); *C08G 59/4021* (2013.01); *C08L 15/00* (2013.01); *C09J 11/08* (2013.01); *C09J 163/00* (2013.01)

(58) Field of Classification Search
None
See application file for complete search history.

(56) References Cited

U.S. PATENT DOCUMENTS

| | | | |
|---|---|---|---|
| 4,096,107 A | 6/1978 | Roberts et al. | |
| 5,140,069 A * | 8/1992 | Mulhaupt | C08L 63/00 525/109 |
| 5,162,437 A | 11/1992 | Hayashi et al. | |
| 5,420,312 A | 5/1995 | Andrews et al. | |
| 2004/0122176 A1 | 6/2004 | Chao et al. | |
| 2010/0041814 A1 | 2/2010 | Starner et al. | |
| 2015/0307640 A1 | 10/2015 | Berlineanu et al. | |

FOREIGN PATENT DOCUMENTS

| | | |
|---|---|---|
| EP | D491529 A1 | 6/1992 |
| EP | 1323739 A2 | 7/2003 |
| EP | 2805981 A1 | 11/2014 |
| EP | 2679605 B1 | 10/2015 |

OTHER PUBLICATIONS

Matsuda, H. et al., Adhesive Properties of Systems of Partially Neutralized Carboxyl-Terminated Liquid Rubber-Anhydride-Bisepoxide, J. Appl. Polymer Sci., vol. 26, pp. 1931-1940 (1981), Marugame, Kagawa-ken, Japan.
Starner, W., Alternatives in Toughening, presented at Thermoset Resin Formulators Association, Chicago, IL (Sep. 15-16, 2008).
Technical Bulletin HYPRO Reactive Liquid Polymers 2000X162, Published Apr. 2012 (NJ) and Product Data Sheets published Jun. 2006.
Vilar, W. et al., Characterization of Hydroxyl-Terminated Polybutadiene, Polymer Bulletin 33, pp. 557-561, Springer-Verlag (1994).
Binder, John L., Microstructures of Polybutadienes and Butadiene-Styrene Copolymers, Ind. 2nd Eng. Chem., vol. 46, No. 8, pp. 1727-1730 (1954).
Sartomer Product Bulletin, Hydroxyl Terminated Polybutadiene Resins and Derivatives, Exton, PA (Undated).
Meyer, A.W., Effects of Polymerization Temperature on Structure, Ind. and Eng. Chem., vol. 41, No. 8, pp. 1570-1577 (1949).
Barcia, F. et al., Synthesis and Properties of Epoxy Resin Modified with Epoxy-Terminated Liquid Polybutadiene, Polymer 44, pp. 5811-5819 (2003).
Starner, W., The Search for Improved Alternatives in Epoxy Toughening, Adhesives Magazine, Jun. 2009.
Press Releases of new product HYPRO 200X174, Oct. 2010 (3 pages) and (Material) Safety Data Sheets (8 pages) (Sep. 2010).

* cited by examiner

*Primary Examiner* — Michael J Feely
(74) *Attorney, Agent, or Firm* — Emerald Specialty Polymers, LLC; Lewis D. Craft

(57) ABSTRACT

Novel method for production of epoxy terminated butadiene and butadiene acrylonitrile copolymer tougheners synthesized through the use of hydroxyl terminated polybutadiene and hydroxyl terminated butadiene acrylonitrile copolymers as starting materials. The epoxy terminated butadiene and butadiene acrylonitrile copolymers synthesized by the novel method have unexpectedly lower viscosity, contain no free epoxy and provide good improvements in T-peel resistance over traditional tougheners produced using traditional methods. Adhesives, composites and coatings utilizing the tougheners of the inventive method are within the scope of the invention.

6 Claims, No Drawings

# EPOXY TERMINATED BUTADIENE AND BUTADIENE ACRYLONITRILE COPOLYMERS

FIELD OF THE INVENTION

This invention is directed to epoxy terminated butadiene polymers (ETB) and epoxy terminated butadiene acrylonitrile copolymers (ETBN) and a novel method of synthesis thereof. The novel method of synthesis results in formation of the glycidyl ether of hydroxyl terminated polybutadiene (HTB) or hydroxyl terminated polybutadiene acrylonitrile copolymers (HTBN) having distinct advantages over prior art compositions. The inventive compositions are lower in viscosity, have lower epoxide equivalent weight compared to prior art ETB and ETBN compositions, contain no free epoxy and provide comparable T-Peel resistance to that achieved with traditional tougheners and improved T-peel resistance over compositions having no toughener present.

BACKGROUND OF THE INVENTION

The invention is directed to novel, low viscosity epoxy-terminated polymers, a method for their production and compositions containing them. The epoxy-terminated polymers of the invention are useful as tougheners and provide a significant improvement over traditional epoxy adduct tougheners known in the art.

Reactive liquid polymer epoxy adducts have been used for many years for toughening composites and adhesives and provide outstanding improvement at room temperature. Epoxy adducts achieving improved performance at low temperatures are also known in the art. Generally, an epoxy adduct is a product of a reaction between a polymer terminated with proton donating functional groups and an epoxide. Among the most important adducts are epoxy terminated polybutadiene polymers (ETB) and epoxy terminated polybutadiene acrylonitrile copolymers (ETBN), which are industrially significant when used as tougheners in thermoset resins for applications in adhesives, composites and coatings.

Traditional methods of synthesis of ETBN include the reaction of a diepoxide, such as the diglycidyl ether of bisphenol A (DGEBA), with a carboxyl terminated butadiene acrylonitrile (CTBN) copolymer. CTBN's and their corresponding adducts with bisphenol A are well known to the industry and are often used as a benchmark for epoxy modifier studies. The traditional reaction is run using a large stoichiometric excess of epoxy to carboxyl groups in order to limit chain extension of the polymer. Despite the large excess of epoxy, chain extension occurs to some extent in the reaction, which can lead to an increase in viscosity, in both the ETBN and the final formulation in which it is used. And, because of the stoichiometric excess of epoxy, the thermoset formulator must account for unreacted epoxy when formulating. Traditional adducts contain about 40% rubber and about 60% unreacted epoxy. Hence, a formulator must use more of the adduct to achieve toughening, resulting in increased viscosity. Addition of organic diluents is one approach to reduce viscosity of prior adducts.

To overcome the viscosity disadvantages of epoxy adducts, efforts to develop lower viscosity epoxy-terminated polymers having no free (unreacted epoxy) persisted. Methods for preparing glycidyl esters and ethers of CTB and CTBN were developed. One such method is detailed in U.S. Patent Publication 2010/0041814 A1, wherein glycidyl esters of CTBN and CTB are synthesized by the reaction of CTBN or carboxyl terminated butadiene (CTB) with epichlorohydrin and subsequent ring closure with sodium hydroxide, using commercially available starting materials, such as Hypro® 2000X162 ETB and 1300X8 and 1300X13. This publication describes, inter alia, a process for synthesizing ETB starting from CTB as shown in Example 1. The viscosity of the ETB produced from the process CTB in Example 1 is stated to be 35,000 cP, at 25° C. The publication also describes the synthesis of ETBN starting from CTBN. The viscosity of the final ETBN's described in Examples 2 through 4 range from 63,000 cP to 576,000 cP at 27° C., with the 10% acrylonitrile polymer giving the lowest viscosity of 63,000 cP and the 26% acrylonitrile polymer giving the highest viscosity of 576,000 cP. The disclosed processes did not utilize an excess of epoxy and, thus, did not result in epoxy-terminated polymers containing free epoxy. The resulting products were almost 100% rubber, as compared to prior art adducts. Viscosities measured were similar to prior art epoxy adducts, but because less is required in formulating due to the lack of free epoxy, a much lower viscosity increase in the final formulated adhesive is achieved.

U.S. Patent Publication 2015/0307640 A1 describes a process for making ETB using HTB as a starting material. The process utilizes a free radical produced HTB, which is then reacted with epichlorohydrin, an aromatic solvent and solid and aqueous NaOH. The ETB produced in Example 1 has a stated viscosity of 14 Pa·s (14,000 cP) at 20° C.

U.S. Pat. No. 5,420,312 also describes the synthesis of ETB from HTB, but gives no detailed information on the properties of the final product or the exact process conditions for using HTB.

Although the known methods described above provide ETB polymers and ETBN copolymers, the polymers are not necessarily useful for certain applications due to viscosity considerations. Viscosity is an important property in adhesive applications in order to apply the adhesive correctly and also avoid the use of epoxy diluents to reduce viscosity. If the viscosity is too high, an adhesive may be hard to handle and apply to the substrate. In this situation, a formulator could add epoxy functional diluents to reduce the viscosity, but this often comes at the expense of thermal and chemical resistance properties.

There remains a need, therefore, for ETB and ETBN polymers and processes for making them, which achieve lower viscosity than that achieved by processes already known in the art. Desirably, there is a need for processes that provide low viscosity ETB and ETBN polymers without sacrificing the toughening properties in adhesive, composite and other applications where toughening is desired.

A novel method of producing ETB and ETBN has been discovered, which achieves even lower viscosity ETB polymers and ETBN copolymers not previously achieved through prior art methods. The inventive method utilizes HTB or HTBN polymer as a starting material. HTB and HTBN polymers are known in the art and commercially available. These polymers are much lower in viscosity than the CTB or CTBN polymers used in known, traditional processes for preparing ETB or ETBN tougheners, and also possess a functionality of >2.0, whereas CTB and CTBN polymers have a functionality of 1.8-1.9. Production of ETB and ETBN starting with the HTB and HTBN according to the inventive method achieves an epoxy-terminated polymer of much lower starting viscosity than the polymers based on CTB and CTBN starting materials, as described above. In addition, the ETB and ETBN produced by the method of the invention achieve even lower viscosity and lower epoxide equivalent weight (EEW) than that achieved by prior art processes that utilize HTB as a starting material. The inventive method does not use or require an excess of epoxy, and the ETB and ETBN thus produced, through the formation of the glycidyl ether of HTB and HTBN, do not contain unreacted epoxy for which the formulator must account.

Unexpectedly, despite their lower viscosity, the ETB and ETBN polymers of the invention achieve comparable toughening in various applications for which tougheners are traditionally used.

An object of the invention is to provide novel ETB and ETBN polymers having lower viscosity than that previously known in the art, while maintaining toughening properties.

Another object of the invention is to provide a method of producing ETB and ETBN polymers having lower viscosity than that previously known in the art.

Still another object of the invention is to provide adhesives, coatings and other compositions requiring tougheners that comprise the ETB and ETBN polymers produced by the inventive method.

SUMMARY OF THE INVENTION

The invention is directed to glycidyl ethers of hydroxyl terminated polybutadiene (HTB) polymers and hydroxyl terminated polybutadiene acrylonitrile (HTBN) copolymers and a method for preparing them. The method of preparation provides epoxy-terminated polymers that offer distinct advantages over that which is currently described in the field and that are unique to the method.

In one embodiment, the invention is directed to a low viscosity epoxy terminated butadiene (ETB) or butadiene acrylonitrile (ETBN) copolymer made through the method of the invention.

In another embodiment, the invention is a method for producing low viscosity ETB and ETBN tougheners.

In still another embodiment, the invention is an adhesive, composite or coating comprising the ETB and ETBN tougheners made by the inventive method.

Although processes for producing ETB and ETBN are known in the art, the ETB and ETBN produced through the present invention offer distinct advantages over the compositions and methods of the prior art and is a distinct improvement other that art, as further discussed herein. ETB produced by the present inventive method results in a polymer that is much lower in viscosity, with a measured viscosity of 8,900 cP at 20° C. This is an even further viscosity reduction than any ETB produced by the known methods discussed above. By way of contrast, the final viscosity of the ETB produced from CTB in Example 1 of U.S. Patent Publication 2010/0041814 had a stated viscosity of 35,000 cP at 25° C., and the ETB produced from HTB in Example 1 of U.S. Patent Publication 2015/0307640 had a stated viscosity of 14,000 cP at 20° C., despite the fact that neither ETB contained excess epoxy.

The lower viscosity of the ETB resulting from the inventive method is particularly advantageous for any application that requires significantly lower viscosity, such as flowable sealants and composite manufacture processes, such as vacuum assisted resin transfer molding (VARTM), both processes of which can incorporate the ETB of the present invention. Also, one-part structural epoxy adhesives must not have a viscosity that is so high that it prevents the adhesive from being applied properly to the substrate or dispensed.

Likewise, ETBN produced by the process of the present invention also has advantages over the prior art. The ETBN produced by the method of the present invention utilizing HTBN containing 10% acrylonitrile has a measured viscosity of 28,000 cP at 27° C., which is less than half that of the ETBN produced from CTBN at equivalent acrylonitrile content. By way of contrast, U.S. Patent Publication 2010/0041814, discussed above, describes the synthesis of ETBN starting from CTBN. The viscosity of the final ETBN's described in Examples 2 through 4 range from 63,000 cP to 576,000 cP at 27° C., with the 10% acrylonitrile polymer giving the lowest viscosity of 63,000 cP and the 26% acrylonitrile polymer giving the highest viscosity of 576,000 cP.

One of the primary applications for the ETBN is in one-part structural adhesives. In this type of application, viscosity of the formulated adhesive is critical. If the viscosity is too high, then the adhesive becomes difficult to apply to the substrate. If the viscosity is too low, then the adhesive will not offer the proper sag resistance. Typical viscosities of one-part epoxy structural adhesives containing thixotropes are 40,000-50,000 cP. Thus, a viscosity of 28,000 cP of the ETBN produced by the inventive method will have little impact on the overall viscosity of a one-part epoxy structural adhesive as compared to the traditional epoxy adducts containing around 40% rubber and 60% free epoxy or the ETBN produced from the glycidyl ether of CTBN.

The present invention's method has distinct advantages over that known in the prior art. U.S. Patent Application 2015/0307640 A1 describes a method for producing the glycidyl ether of a free radical produced hydroxyl terminated polybutadiene. Yet, despite similarities in starting components and reactants, the inventive method achieves, unexpectedly, ETB and ETBN polymers having much lower viscosity. It has been discovered after much experimentation that the molar ratios for the addition of epichlorohydrin and NaOH, i.e., the epichlorohydrin:hydroxyl ratio and the NaOH:hydroxyl ratio, have a significant effect on the properties of the ETB and ETBN produced through the inventive method. It was also found that addition of NaOH as a 50% aqueous solution as compared to an addition of solid or a mixture of aqueous and solid NaOH also had an effect on the properties of the final product. The inventive method does not use an aromatic solvent in the first step of reaction between the terminal hydroxyl groups and epichlorohydrin or in any part of the reaction. Optionally, an aromatic solvent may be used at the end of the reaction as a way to improve filtration of the polymer.

The inventive method produces epoxy terminated low molecular weight liquid rubbers that can be used as tougheners for thermoset systems. These tougheners have several advantages over traditional rubber tougheners, including those based on CTB and CTBN, in that they are low in viscosity, making them easy to handle, and contain no free epoxy, which allows the adhesive formulator more latitude. These newly-developed tougheners also give very good improvement in T-Peel resistance in comparison to the control materials containing no toughener. These new tougheners can find application in fields such as, but not limited to, adhesives, composites and coatings.

DETAILED DESCRIPTION OF THE INVENTION

The invention is directed to novel ETB and ETBN tougheners, a method of preparing them and applications for their use, particularly in thermoset resins.

By way of definition, as used herein, "ETB" means epoxy terminated butadiene, and "ETBN" means epoxy terminated butadiene acrylonitrile polymers. "ETB" and "ETBN" may also be referred to as "glycidyl ethers" of the invention.

"Adduct" means the product of a reaction between a polymer terminated with proton donating functional groups, such as carboxyl or hydroxyl groups, and an epoxide or compound capable of providing an epoxy group to the terminal end of the polymer. The term "adduct" as used herein refers to traditional epoxy adducts that contain around 40 wt. % rubber and around 60 wt. % unreacted or free epoxy.

The inventive glycidyl ethers of HTB or HTBN produced according to the inventive method are referred to as "epoxy-terminated" polymers or copolymers or "ETB or ETBN copolymers" or "ETB or ETBN tougheners". The same terminology is also used to describe glycidyl esters and ethers produced by prior methods that do not include excess epoxy or result in unreacted epoxy in the final polymers.

"Epoxide equivalent weight" or "EEW" reflects the weight of polymer per epoxy group, which indirectly reflects the conversion of terminal hydroxyl groups of butadiene or butadiene acrylonitrile polymers to glycidyl group.

While the inventive method is described primarily with respect to the production of low viscosity ETB's and ETBN's through the formation of the glycidyl ether of HTB or HTBN, respectively, it is expected that the inventive method may also be used with CTB and CTBN starting materials.

Traditionally, the toughening of thermoset resins often involves the introduction of a second phase, usually in the form of a reactive liquid polymer. The polymer is initially soluble in the thermoset matrix, and phase-separates upon cure. The reactive liquid polymer often contains terminal epoxy groups, which are formed typically from the traditional reaction of a diepoxide with the carboxyl terminated polybutadiene acrylonitrile copolymer (CTBN) as discussed above. The reaction takes place using a large stoichiometric excess of epoxy, which on a weight basis equates to about 40% CTBN (rubber) and about 60% diepoxide. Typically, to achieve the maximum in toughness in a one-part epoxy adhesive, 15 parts of epoxy terminated butadiene acrylonitrile (ETBN) are required for 100 parts of epoxy resin. For an ETBN adduct that is 40% rubber by weight, 37.5 pts of adduct must be used with 77.5 parts of diepoxide to achieve 15 parts of rubber (37.5*0.4=15) and 100 parts of diepoxide (77.5+(37.5*0.6)=100). Therefore, the formulator must account for and use the 22.5 parts of epoxy that is already present in the ETBN adduct (60% of 37.5 is diepoxide), which is often problematic in that it can lead to not achieving design targets.

In the reaction of CTBN with epichlorohydrin and subsequent ring closure with sodium hydroxide described above with respect to U.S. Patent Publication 2010/0041814, an ETBN is produced that is 100% rubber with no free epoxy. In a one-part epoxy adhesive, to achieve maximum T-Peel results at 15 phr, the formulator simply mixes 100 parts of diepoxide with 15 parts of the glycidyl ether ETBN produced from CTBN, along with the appropriate curative. The formulator therefore has complete control of the type of diepoxide to be used in the formulation.

Similarly, the present invention is directed to a method to produce ETB and ETBN, using HTB and HTBN, which does not require the formulator to account for extra or an excess of epoxy. Yet, unexpectedly, the viscosities achieved by the present invention for ETB and ETBN are much lower than prior methods for producing ETB and ETBN's without an excess of epoxy regardless of whether CTB, CTBN, HTB or HTBN are utilized as the starting materials.

Suitable hydroxyl terminated polymers for use in the synthesis of the inventive glycidyl ethers include but are not limited to hydroxyl terminated polybutadiene (HTB) polymers or hydroxyl terminated butadiene acrylonitrile (HTBN) copolymers, with acrylonitrile content up to about 26%. Other hydroxyl terminated polymers are considered within the scope of the invention and would be known to one skilled in the art. By way of example only, commercially available hydroxyl terminated polybutadiene and hydroxyl terminated butadiene acrylonitrile copolymers include Hypro® 2800x95 and Hypro® 3000x914.

The molecular weight of the hydroxyl terminated polymers utilized in the process of the invention ranges, but is not limited to, between about 1,200 to 5,000 Daltons, and more preferably of molecular weight approximately 3,000 Daltons.

The hydroxyl value of the hydroxyl terminated polymers utilized in the process of the invention ranges, but is not limited to, about 0.5 meq/g to about 2.0 meq/g. More preferably the hydroxyl value of such polymers is between about 0.60 to about 0.90 meq/g.

The 1,2-vinyl content of the hydroxyl terminated polymers utilized in the process of the invention ranges, but is not limited to, approximately 20% to 80% of the weight of the polymer backbone. More preferably, the 1,2-vinyl content of the polymer backbone is about 20%, with the remainder of the backbone composition being approximately 60% trans-conformation and 20% cis-conformation, although this is not a limitation.

As described above, glycidyl esters of carboxyl terminated polybutadiene (CTB) or carboxyl terminated polybutadiene acrylonitrile (CTBN) copolymers can be formed through the reaction with epichlorohydrin and subsequent ring closure with sodium hydroxide addition. Commercially available glycidyl esters of CTB and CTBN include, among others, Hypro® 2000x174 ETB, 1300x68 ETBN and 1300x63 ETBN. The glycidyl ethers of HTB and HTBN produced by the inventive method offer the advantage over known glycidyl esters of CTB and CTBN in that they have lower viscosity and therefore result in lower viscosity in formulation, giving superior results for different applications that require it, including but not limited to when formulated into an adhesive. The lower viscosity achieved by the inventive glycidyl ethers of HTB and HTBN is due, in part, to the fact that the starting HTB and HTBN copolymers neat have a much lower viscosity than the neat CTB and CTBN copolymers (of similar acrylonitrile level). In addition to giving lower formulated viscosities, the lower neat viscosities of HTB and HTB result in ETB and ETBN copolymers that are easier to handle by the formulator.

Notwithstanding, the glycidyl ether of HTB (ETB) produced by the inventive method still has lower viscosity than the glycidyl ether of HTB (ETB) produced by the method of U.S. Patent Application 2015/0307640, despite the fact that both use HTB as a starting material. The process conditions utilized by the inventive method provide unexpected improvements that cannot be attributed simply to the use of the same or similar starting materials.

In application, the inventive glycidyl ethers may be used both in one and two-part epoxy adhesives, where the toughener is added to the epoxy portion of the formulation, although their use is not limited as such. Other possible applications include but are not limited to coatings and composites. Other applications will be evident to one skilled in the art.

In use, typical concentrations include without limitation 1 to 20 phr. More preferably, an ETBN toughener is used at concentrations of 15 phr in a typical epoxy based adhesive.

Typical curing agents for said adhesives include but are not limited to dicyandiamide of various particle sizes, dicyandiamide of various particle sizes accelerated by a substituted urea, and amine curing agents that are known in the industry. Other curatives commonly known to the industry and one skilled in the art include anhydrides, phenols and mercaptans.

The adhesive formulation can also contain fumed silica which functions as a thixotrope, including but not limited to fumed silicas commonly used in the industry for such purposes, such as Cab-O-Sil® TS-720 from Cabot Corporation.

Other additives for use in adhesive formulations that may be used with ETB or ETBN tougheners are known to one skilled in the art.

Testing of said adhesives is typically accomplished by applying the adhesive to a controlled thickness onto substrates such as electrogalvanized steel, which are then tested for T-Peel or lap shear strength according to methods known to one skilled in the art. Samples can also be cured in appropriately sized plaques and tested for improvements in fracture toughness. Testing can be done at low temperature, room temperature, and elevated temperature to gauge all aspects of performance improvements.

The invention is described in the examples below, although the invention is not limited thereby.

EXAMPLES

Comparative Examples 1 and 2 below detail the synthesis of prior art glycidyl ethers produced from hydroxyl terminated polybutadiene (HTB) in a prior art method as disclosed in U.S. Patent Publication 2015/0307640. Inventive Examples 1 and 2 below detail the synthesis of the inventive glycidyl ethers of hydroxyl terminated polybutadiene (HTB) and hydroxyl terminated butadiene acrylonitrile (HTBN) copolymer, respectively, and demonstrate the significant improvement of the inventive method along with the advantages in the properties of the products produced by the inventive method. Examples 3-6, below, demonstrate the effect of utilizing variables from prior processes and reflect that the inventive method is most preferable to produce a product of certain composition, surprisingly one of a low epoxide equivalent weight and low viscosity other than that produced by prior processes.

Comparative Example 1

The following method was reproduced according to Example 1 of U.S. Patent Publication 2015/0307640 A1. Two batches were run.

116.8 g (0.1 mol of OH equivalent) of Hypro® 2800x95 HTB was weighed into a 3 neck round bottom flask along with 83.2 g of toluene (aromatic solvent) and 0.19 g of $SnCl_2$. The flask was equipped with a mechanical stirrer, reflux condenser, nitrogen blanketing and dropping funnel. 10.18 g (0.11 mol) of epichlorohydrin was added to the flask at room temperature with stirring. The flask was placed in an oil bath equipped with temperature control and heated to a temperature of 100° C. for five hours with stirring. The mixture was then cooled to 50° C. and within 30 minutes 1.6 g (0.02 mol) of 50% aqueous NaOH solution and 3.6 g (0.09 mol) of pulverized NaOH, in portions, were added. The mixture was stirred for an additional hour at 50° C. The reaction mixture was then filtered and the organic phase was dried over $MgSO_4$ and, filtered and isolated in vacuo from the solvent. The synthesis was repeated and the measured properties of both ETB compositions produced are listed in Table 1, along with the properties as listed in U.S. Patent Publication 2015/0307640 A1. The results in Table 1 demonstrate that the method disclosed in U.S. Patent Publication 2015/0307640 may not be completely reproducible to one skilled in the art. Reproduction according to the disclosed method, resulted in an epoxide equivalent weight that was much higher than stated, which indicates an incomplete conversion of hydroxyl to glycidyl groups.

TABLE 1

| Final Property | U.S. Patent Application 2015/0307640 A1 | Batch 1 | Batch 2 |
|---|---|---|---|
| Viscosity @ 20° C. (Pa · s) | 14 | 11 | 10 |
| EEW (Epoxide Equivalent Weight) (g/eq) | 1840 | 3421 | 3270 |

TABLE 1-continued

| Final Property | U.S. Patent Application 2015/0307640 A1 | Batch 1 | Batch 2 |
|---|---|---|---|
| Tg (° C.) | −78 | −78 | −78 |
| Yield (g) | 112 | 80 | 90 |

Comparative Example 2

The following method was reproduced according to Example 2 of U.S. Patent Publication 2015/0307640 A1. Two batches were run.

58.4 g (0.1 mol of OH equivalent) of Hypro® 1200x90 HTB was weighed into a 3 neck round bottom flask along with 41.6 g of toluene (as a solvent) and 0.19 g of $SnCl_2$. The flask was equipped with a mechanical stirrer, reflux condenser, nitrogen blanketing and dropping funnel. 10.18 g (0.11 mol) of epichlorohydrin was added to the flask at room temperature with stirring. The flask was placed in an oil bath equipped with temperature control and heated to a temperature of 100° C. for five hours with stirring. The mixture was then cooled to 50° C. and within 30 minutes 1.6 g (0.02 mol) of 50% aqueous NaOH solution and 3.6 g (0.09 mol) of pulverized NaOH, in portions, were added. The mixture was stirred for an additional hour at 50° C. The reaction mixture was then filtered and the organic phase was dried over $MgSO_4$ and filtered and isolated by solvent removal under vacuum distillation. The synthesis was repeated and the measured properties of both ETB compositions produced are listed in Table 2, along with the properties as listed in US Patent Application 2015/0307640 A1. The results in Table 2 also demonstrate that the method disclosed in US Patent Application 2015/0307640 may not be completely reproducible to one skilled in the art. Again, reproduction resulted in an epoxide equivalent weight that was much higher than stated, which indicates an incomplete conversion of hydroxyl to glycidyl groups.

TABLE 2

| Final Property | U.S. Patent Application 2015/0307640 A1 | Batch 1 | Batch 2 |
|---|---|---|---|
| Viscosity @ 20° C. (Pa · s) | 4.2 | 23 | 16 |
| EEW (Epoxide Equivalent Weight) (g/eq) | 1010 | 1323 | 1718 |
| Tg (° C.) | −71 | −72 | −72 |
| Yield (g) | 56.3 | 45 | 54 |

Inventive Example 1. Synthesis of the Glycidyl Ether of Hydroxyl Terminated Polybutadiene (HTB) According to the Inventive Method The inventive method for producing the glycidyl ether of hydroxyl terminated polybutadiene (HTB) offers advantages over prior art methods in that conversion of hydroxyl groups to glycidyl groups is much more complete, thus achieving a lower epoxide equivalent weight. The viscosity of the glycidyl ether of hydroxyl terminated polybutadiene produced by the inventive method is also unexpectedly lower than that produced in prior art. Furthermore, the inventive method does not require the presence or an aromatic solvent such as toluene, which complicates the manufacturing process due to the need to isolate and recover both epichlorohydrin and toluene. An aromatic solvent may be used optionally at the end of the inventive method to aid in filtration only. It is not part of the reaction.

It was found that despite similarities of the inventive method to known methods, certain conditions utilized in the inventive method had a significant impact on the properties of the resulting ETB and ETBN compositions. In particular, the inventive method utilizes a reaction of hydroxyl with epichlorohydrin in a mol ratio most preferably between 25:1 and 35:1 (epichlorohydrin:hydroxyl). U.S. Patent Publication 2010/0041814 reacts a carboxyl terminated polybutadiene with epichlorohydrin at a ratio of approximately 22:1 (epichlorohydrin:carboxyl) to produce the ETB. This ratio reflects a huge excess, and it was not expected that a higher epichlorohydrin:hydroxyl ratio (>22:1) would result in a more complete conversion. Yet, by using a higher mol ratio of epichlorohydrin:hydroxyl equivalents in the inventive method, it has surprisingly been found that an ETB composition with lower EEW is produced.

Further, the method of U.S. Patent Publication 2015/0307640A1, as shown in Comparative Examples 1 and 2, uses a mixture of 50% aqueous NaOH and pulverized solid NaOH in the synthesis, with the majority of the equivalents being from the solid NaOH addition. By using only 50% aqueous NaOH in the inventive method, unexpectedly, a product with a lower EEW is produced in a much shorter time.

Higher molar ratios of sodium hydroxide to OH equivalents in the inventive method were found to yield a glycidyl ether with lower epoxide equivalent weight, indicating a more complete conversion of hydroxyl groups. By contrast, U.S. Patent Publication 2010/0041814 A1, in the conversion of carboxyl terminated polybutadiene polymers and polybutadiene acrylonitrile copolymers, uses a mol ratio of 1.17:1 (NaOH:carboxyl) and U.S. Patent Application 2015/0307640 A1 uses a mol ratio of 1.1:1 (NaOH:hydroxyl). The inventive method has found that a mol ratio of greater than 1.5:1, most preferably 2.1:1, unexpectedly yields a product with lower epoxide equivalent weight, indicating more complete conversion of hydroxyl groups to glycidyl ether groups.

An embodiment of the inventive method is illustrated below:

500 grams of Hypro® 2800x95 (HTB) (0.42 mol of OH equivalent) and 1152 g of epichlorohydrin (12.4 mol) were weighed into a 3 neck, round bottom flask equipped with mechanical stirring and a nitrogen inlet and outlet. The reaction mixture was heated to 50° C. and stirred for 15 minutes. 9 grams of tetramethylammonium chloride was slowly added, after which time the reaction temperature was raised to 90° C. and held at 90° C. for 2 hours. The nitrogen was turned off, the reaction temperature was lowered to 60° C. and set up for azeotropic distillation. Vacuum was applied while maintaining reaction temperature at 60° C. and 108 g of 50% sodium hydroxide was added to the reactor over the course of one hour. Azeotropic distillation was continued for an additional 25 minutes after sodium hydroxide addition was complete, with recycling of the epichlorohydrin back to the reaction. A small portion of the reaction was then tested for hydrolysable chlorides content (HCC) and epoxide equivalent weight (EEW). If the reaction is not within acceptable limits, further caustic was added and azeotropic distillation continued as per the steps outlined above.

Once the target HCC and EEW were achieved, the reaction mixture was cooled to room temperature and the pH was adjusted to <7.0 with a 40% solution of monosodium phosphate. 700 grams of xylene were added and the reaction mixture was allowed to stand overnight, after which time it was filtered through a 50-micron filter paper using celite as a filter aid. The filtrate was poured into 50° C. water without stirring and phase separated. The organic layer was transferred to a vacuum distillation unit, and distilled under full vacuum at 110° C. After the removal of volatiles, 19 grams of water was slowly added to the flask at 110° C. under vacuum to steam distill any remaining xylenes and epichlorohydrin. Vacuum distillation was continued for an additional 20 minutes, after which time the completed reaction was discharged. The final ETB thus had an EEW of 1748 g/eq and a viscosity of 5,800 cP measured at 27° C.

Inventive Example 2. Synthesis of Glycidyl Ether of Hydroxyl Terminated Butadiene Acrylonitrile Copolymer (HTBN The synthesis of the glycidyl ether of hydroxyl terminated polybutadiene acrylonitrile copolymer can most preferably utilize an epichlorohydrin to hydroxyl mol ratio of 22:1, while the synthesis of the ETB requires a higher mol ratio.

750 grams of a HTBN containing 14% acrylonitrile (Hypro® 3000x914) (0.52 mol of OH equivalent) and 1053 g of epichlorohydrin (11.4 mol) were weighed into a 3 neck, round bottom flask equipped with mechanical stirring and a nitrogen inlet and outlet. The reaction mixture was heated to 50° C. and stirred for 15 minutes. 11 grams of tetramethylammonium chloride was slowly added, after which time the reaction temperature was raised to 90° C. and held at 90° C. for 2 hours. The nitrogen was turned off, the reaction temperature was lowered to 80° C. and set up for azeotropic distillation. Vacuum was applied while maintaining reaction temperature at 80° C. and 91 g of 50% aqueous sodium hydroxide was added to the reactor over the course of one hour. Azeotropic distillation was continued for an additional 25 minutes after sodium hydroxide addition was complete, with recycling of the epichlorohydrin back to the reaction. A small portion of the reaction was then tested for hydrolysable chlorides content (HCC) and epoxide equivalent weight (EEW). If the reaction was not within acceptable limits, further caustic was added and azeotropic distillation continued as per the steps outlined above. Once the target HCC and EEW were achieved, the reaction mixture was cooled to room temperature and the pH was adjusted to <7.0 with a 40% solution of monosodium phosphate. 700 grams of xylene were added and the reaction mixture was allowed to stand overnight, after which time it was filtered through a 50-micron filter paper using celite as a filter aid. The filtrate was poured into 50° C. water without stirring and phase separated. The organic layer was transferred to a vacuum distillation unit, and distilled under full vacuum at 110° C. After the removal of volatiles, 19 grams of water was slowly added to the flask at 110° C. under vacuum to steam distill any remaining xylenes and epichlorohydrin. Vacuum distillation was continued for an additional 20 minutes, after which time the completed reaction was discharged. The ETBN thus produced had an EEW of 1818 g/eq and a viscosity of 35,600 cP as measured at 27° C.

Examples 3-6—Variations of Conditions in the Production of ETB

Examples 3 through 6 compare the effects of using solid sodium hydroxide, a ratio of sodium hydroxide to OH equivalent of less than 2.1, and a molar equivalent of epichlorohydrin to OH equivalent of less than 30 in the inventive process. The method of Inventive Example 1 was utilized in all cases, with the changes noted in Table 3. Of all the variations attempted, the process of Inventive Example 1 yielded a product with the lowest EEW in the shortest amount of time for ETB, thus demonstrating the advantages of the present process over prior art processes.

TABLE 3

| | Comparative Example 3 | Comparative Example 4 | Comparative Example 5 | Comparative Example 6 | Inv. Example 1 |
|---|---|---|---|---|---|
| Sodium hydroxide form | solid | solid | 50% NaOH aq. | 50% NaOH aq. | 50% NaOH aq. |
| mol ratio of NaOH:OH Equivalents | 1.1 | 2.1 | 1.5 | 2.1 | 2.1 |
| mol ratio of Epichlorohydrin (EPI):OH Equivalents | 30 | 30 | 30 | 22 | 30 |
| EEW after 4 hours of NaOH treatment (g/eq) | Not meas. | 6875 | 2234 | 1910 | 1748 |
| EEW after 6 hours of NaOH treatment (g/eq) | 3823 | 2158 | 2023 | 1900 | |
| EEW after 14 hours of NaOH treatment (g/eq) | 3095 | | | | |

Example 7—Adhesive Property Results Using Inventive ETB and ETBN

A significant aspect of the invention is the production of lower viscosity ETB and ETBN polymers than that known in the art, which have comparable toughening properties to ETB's and ETBN's produced by prior processes. The products prepared in both Inventive Examples 1 and 2 were formulated into a one-part, dicyandiamide cured, urea accelerated epoxy adhesive using fumed silica as the thixotrope. T-Peel was tested as per ASTM D1876 on electrogalvanized steel substrates. Formulations and adhesive results are listed in Table 4, along with the neat viscosities of the polymers.

The T-Peel performance of the glycidyl ether products showed similar performance to traditional adducts. Traditional adducts usually show the best performance in one-part structural adhesive formulations, and other competing technology, such as block copolymers and core shell particles, often will have lower formulated viscosity but not achieve the level of performance in terms of T-Peel. The inventive products thus combine a lower viscosity with excellent results in T-Peel.

In accordance with the patent statutes, the best mode and preferred embodiment have been set forth, the scope of the invention is not limited thereto, but rather by the scope of the attached claims.

What is claimed is:

1. A method of preparing a low viscosity epoxy terminated polybutadiene polymer, comprising the steps of:

TABLE 4

One Part Adhesive Formulations and Results.

| Adhesive | Parts Epoxy (Epalloy 7190) | Parts Toughener | Parts Dicyandiamide Curing Agent (Omicure DDA10) | Parts Urea Accelerator (Omicure U-24) | Parts Fumed Silica Thixotrope (CabOSil TS-720) | T-Peel (RT) pli | T-Peel (−40° C.) pli | Viscosity of Toughener Neat @ 27° C. (cP) |
|---|---|---|---|---|---|---|---|---|
| A (Control) | 100 | 0 | 5 | 2 | 3 | 6.7 | 4.9 | NA |
| B HyPox RA840 - ETBN adduct, 18% acrylonitrile | 77.5 | 37.5 | 5 | 2 | 3 | 24.4 | 32.8 | 170,000 |
| C HyPox RA1340 - ETBN adduct, | 77.5 | 37.5 | 5 | 2 | 3 | 24.0 | 23.5 | 550,000 |
| D Glycidyl Ether of HTB 2800 × 95 | 100 | 10 | 5 | 2 | 3 | 14.9 | 15.7 | 5600 |
| E Glycidyl Ether of HTBN, 10% acrylonitrile | 100 | 15 | 5 | 2 | 3 | 19.1 | 24.9 | 28,000 | a. providing a hydroxyl terminated butadiene polymer;
b. adding epichlorohydrin to the hydroxyl terminated butadiene polymer with mixing;
c. heating the mixture to a maximum temperature of 90° C.;
d. holding the mixture for a set time;
e. distilling the mixture with aqueous sodium hydroxide;
f. filtering the mixture;
g. adjusting the pH with monosodium phosphate;
h. adding the mixture to water; and
i. separating the organic layer for further distillation and removal of volatiles, wherein the epichlorohydrin:hydroxyl ratio ranges between 25:1 and 35:1, and wherein the NaOH:hydroxyl ratio is greater than about 1.5:1.

2. An epoxy adhesive composition consisting essentially of:
a. 100 parts of epoxy;
b. an epoxy terminated polybutadiene polymer prepared from the method of claim 1, present as a reactive toughener in an amount of about 10 to about 15 phr of epoxy;
c. a curing agent; and
d. a thixotrope,
wherein the epoxy terminated polybutadiene polymer is the only reactive toughener present in the epoxy adhesive composition; and
wherein the epoxy terminated polybutadiene polymer provides a lower viscosity epoxy adhesive formulation having improved T-peel strength.

3. The epoxy adhesive composition according to claim 2, wherein the curing agent is a dicyandiamide and the thixotrope is fumed silica.

4. A method of preparing a low viscosity epoxy terminated butadiene acrylonitrile copolymer, comprising the steps of:

a. providing a hydroxyl terminated butadiene acrylonitrile copolymer;
b. adding epichlorohydrin to the hydroxyl terminated butadiene acrylonitrile polymer with mixing;
c. heating the mixture to a maximum temperature of 90° C.;
d. holding the mixture for a set time;
e. distilling the mixture with aqueous sodium hydroxide;
f. filtering the mixture;
g. adjusting the pH with monosodium phosphate;
h. adding the mixture to water; and
i. separating the organic layer for further distillation and removal of volatiles, wherein the epichlorohydrin:hydroxyl ratio ranges between 22:1 to 35:1, and wherein the NaOH:hydroxyl ratio ranges is greater than about 1.5:1.

5. An epoxy adhesive composition consisting essentially of:
a. 100 parts of epoxy;
b. an epoxy terminated butadiene acrylonitrile copolymer prepared from the method of claim 4, present as a reactive toughener in an amount of about 10 to about 15 phr of epoxy;
c. a curing agent; and
d. a thixotrope,
wherein the epoxy terminated butadiene acrylonitrile copolymer is the only reactive toughener present in the epoxy adhesive composition; and
wherein the epoxy terminated butadiene acrylonitrile copolymer provides a lower viscosity adhesive formulation having improved T-peel strength.

6. The epoxy adhesive composition according to claim 5, wherein the curing agent is a dicyandiamide and the thixotrope is fumed silica.

* * * * *